Figure 1:
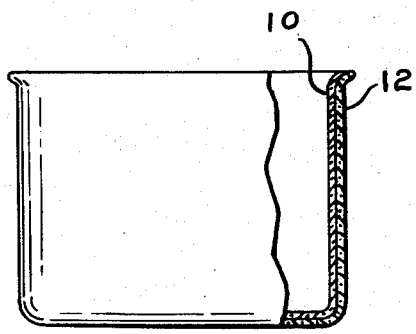

Dec. 10, 1963     F. W. MARTIN     3,113,878
THERMALLY DEVITRIFIABLE SEALING GLASSES AND COMPOSITE ARTICLES
Filed Jan. 26, 1960     2 Sheets-Sheet 1

INVENTOR.
FRANCIS W. MARTIN
BY
Clarence R. Patty, Jr.
ATTORNEY

United States Patent Office
3,113,878
Patented Dec. 10, 1963

3,113,878
THERMALLY DEVITRIFIABLE SEALING GLASSES AND COMPOSITE ARTICLES
Francis W. Martin, Painted Post, N.Y., assignor to Corning Glass Works, Corning, N.Y., a corporation of New York
Filed Jan. 26, 1960, Ser. No. 4,637
5 Claims. (Cl. 106—54)

This invention relates to thermally devitrifiable sealing glasses and the art of producing composite articles with such glasses. It is particularly concerned with sealing glasses adapted to use with component parts preformed from refractory materials (e.g., glasses, metals, ceramics) having linear thermal coefficients of expansion on the order of $30\text{--}50 \times 10^{-7}$.

A thermally devitrifiable glass is one characterized by inhibited or delayed devitrification. This means that the glass may be heated to its sealing temperature to form a conventional fused glass seal without substantial devitrification and thereafter rapidly and uniformly thermally devitrified to a partially crystalline mass, that is a vitreous mass characterized by at least one crystal phase. The production of devitrified glass seals is generally described in United States Patent No. 2,889,952, issued to S. A. Claypoole. In accordance with the patent teaching, a thermally devitrifiable sealing glass is finely divided, applied to a sealing surface in the form of a fluid slip or in other desired manner, heated to the sealing temperature of the glass and thermally devitrified in situ.

In producing a composite article embodying one or more preformed components, the sealing operation must be conducted at temperatures below the deformation temperature of the preformed component sealing surfaces. In other words, the sealing temperature at which the sealing material becomes sufficiently fluid to wet a sealing surface and form a seal therewith, must be below the softening or deformation temperature of such surface. Thermally devitrifiable glasses are particularly desirable because, while they have low sealing temperatures, their devitrification product ordinarily is capable of withstanding much higher temperatures without softening or deforming. Thus, a composite article embodying such a seal may be well adapted to further heat treatment, such as bake out and exhaust operations, at temperatures corresponding to, or even above, the sealing temperature.

The thermal expansion coefficients of refractory materials, particularly glasses, vary widely depending on the selected material or composition. In general, however, commercially used materials may be considered as falling within a high expansion range of about $80\text{--}120 \times 10^{-7}$, an intermediate expansion range of about 30–50, or a low expansion range of 0–10. The earlier mentioned Claypoole patent sets forth lead-zinc-borate glasses which are thermally devitrifiable and particularly suited to forming seals with the materials of the above-mentioned high expansion range. It is a primary purpose of the present invention to provide thermally devitrifiable sealing glasses having sealing and expansion characteristics which adapt them to use with materials in the second or intermediate expansion range of about $30\text{--}50 \times 10^{-7}$. Such materials include borosilicate and aluminosilicate glasses, medium expansion glass ceramics, zircon, electrical porcelains, molybdenum and tungsten. It will be appreciated that linear thermal expansion coefficients are in terms of cm./cm.° C. and are measured over a temperature range, customarily 0–300° C.

Figure 5:
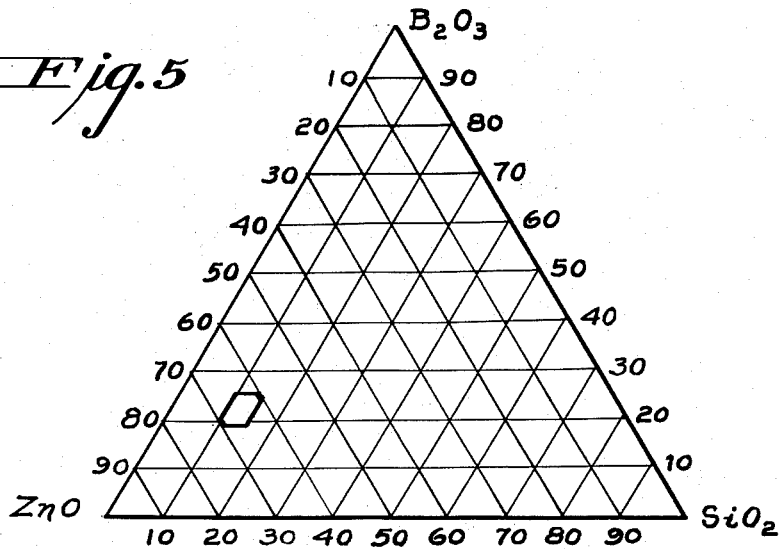

Thermally devitrifiable glasses in accordance with the present invention are zinc-silico-borate glasses composed essentially of about 60–70% ZnO, about 19–25% $B_2O_3$, and about 10–16% $SiO_2$ glass consisting of these three essential oxides being illustratively shown as a closed area in a ternary diagram in FIG. 5 of the accompanying drawing. The total of these three essential oxides is at least about 90% of the glass composition. The glasses may additionaly contain minor amounts of other compatible glass forming materials, primarily other divalent metal oxides including PbO, glass colorants and fining agents such as arsenic and antimony oxides. Such glasses, in a thermally devitrified, crystalline state, have thermal expansion coefficients which render them compatible with low expansion materials having coefficients on the order of $30\text{--}50 \times 10^{-7}$. Further, these glasses undergo inhibited thermal devitrification at sealing temperatures on the order of 700° C. and above.

Glasses having large ZnO contents devitrify more readily with the result that devitrification may be initiated and proceed too rapidly to permit the glass becoming sufficiently fluid to wet a sealing surface and flow. For this reason glasses containing over 70% ZnO are generally unsatisfactory. The present glasses, particularly those with a ZnO content less than 65% are sensitive to moisture and other severe weathering conditions which accelerate devitrification rates. It is desirable, therefore to chill or quench the glasses without exposure to water, and to otherwise use care in handling and storage of the glasses prior to use. Glasses having a low ZnO content may also produce a devitrification product that is lumpy and coarse textured. Further, it is difficult to melt a single phase glass containing below about 60% ZnO. Accordingly a ZnO content of about 65% is preferred.

$B_2O_3$ and $SiO_2$ function jointly as glass forming oxides. Glasses containing more than about 16% $SiO_2$, or conversely less than about 19% $B_2O_3$, tend to devitrify too rapidly for proper fusion sealing. Glasses having an $SiO_2$ content below about 10% weather badly on standing and devitrify too rapidly for proper seal formation. Glasses containing over about 25% $B_2O_3$ also devitrify too rapidly during sealing.

Studies have indicated that such zinc-silico-borate glasses produce a devitrification product in which the predominant crystal phases are one or more of the crystals, $ZnO \cdot B_2O_3$, $5ZnO \cdot 2B_2O_3$ and willemite, $2ZnO \cdot SiO_2$. These crystals are reported to have average thermal expansion coefficients on the order of $25\text{--}35 \times 10^{-7}$ over a range of 0–600° C. A further feature of the invention then is production of a thermally devitrified glass seal containing one or more of the identified types of crystal.

I have also found that a devitrification product of a present glass is characterized by a linear thermal expansion coefficient that is lower than the corresponding coefficient of the parent glass. Also, the expansion coefficient decreases as the temperature of devitrification increases above 700° C. Thus, the average linear thermal expansion coefficient of the glass composition 1, infra, is about $42 \times 10^{-7}$ as measured between 0–300° C. on a test piece of undevitrified glass. For comparative purposes, bars for expansion measurements were pressed from pulverized glass and fired separately at temperatures of 700° C. and 750° C. for one hour to simulate sealing conditions the firing schedules being diagrammatically shown in accompanying FIGS. 6a and 6b.

Expansion measurements made on these test bars showed an average linear coefficient of about $36 \times 10^{-7}$ units for the bar fired at 700° C. and $24 \times 10^{-7}$ for the bar fired at 750° C. However, above 300° C. the thermal expansion characteristics of the devitrification product correspond more closely to conventional glasses than to ceramics, that is the slope of the expansion curve gradually becomes steeper as the temperature increases and is not a straight line function of temperature.

Translated into terms of utility, this means that the glass may be compatibly sealed with a commercial borosilicate glass having an annealing temperature of 560° C. and an expansion of $33 \times 10^{-7}$ at sealing and devitrification temperatures of 700° to 750° C. since the setting temperature of the seal is that of the borosilicate glass, about 20° C. below the annealing temperature or 540° C. However, in sealing to higher setting point materials such as aluminosilicate glasses and tungsten, the setting temperature of the seal is about 680° C. and is determined by the devitrified sealing material. In the latter type of seal then, the seal is compatible with materials of somewhat higher average expansion characteristics, that is about $36-42 \times 10^{-7}$. This is due to the change in expansion curve characteristic at higher temperatures as explained above.

There are then, indications that a continuing devitrification occurs at higher temperatures of sealing and devitrification. It also appears that the glassy matrix, which results as crystalline components are formed from the parent glass composition, also has a relatively low thermal coefficient, although the exact composition is difficult to ascertain. The expansion curve of the devitrification product would indicate that expansion is primarily a result of changes in this glass as devitrification proceeds further. It will be appreciated that, while precise coefficients and temperatures will vary somewhat with different glasses, the general phenomenon described above is characteristic of all of the present glasses.

By way of further illustrating the invention, the following table sets forth selected glass compositions in terms of percent by weight as calculated from the glass batch on an oxide basis:

|  | 1 | 2 | 3 | 4 | 5 | 6 | 7 |
|---|---|---|---|---|---|---|---|
| ZnO | 65 | 65 | 65 | 65 | 62½ | 60 | 60 |
| $B_2O_3$ | 22½ | 20 | 25 | 23 | 22½ | 22½ | 22½ |
| $SiO_2$ | 12½ | 15 | 10 | 10 | 12½ | 12½ | 12½ |
| $Al_2O_3$ |  |  |  | 2 |  |  |  |
| MgO |  |  |  |  | 2½ |  |  |
| BaO |  |  |  |  |  | 5 |  |
| PbO |  |  |  |  |  |  | 5 |

The zinc-silico-borate glasses of this invention may be melted in accordance with conventional glass melting procedures by heating a suitably formulated and mixed glass batch to a melting temperature on the order of 1300° C. for a sufficient time to produce homogeneous glass for delivery from the melting unit. Thus the batch may be introduced into a refractory container, melted in a gas fired melting unit and poured from such container at the close of the melting process. Preferably the molten glass is rapidly cooled as by quenching, to avoid any possibility of incipient devitrification and also to provide the glass in a shattered or granular form. The glass may be either water-quenched, or rapidly cooled by being poured over a chilled metal surface or between water-cooled metal rollers. Water-cooling is generally less desirable since it may cause weathering of the glass. However, where water-quenching is employed, it is desirable to employ up to 2% or so of alumina in the glass composition to stabilize it against weathering.

Figure 2:
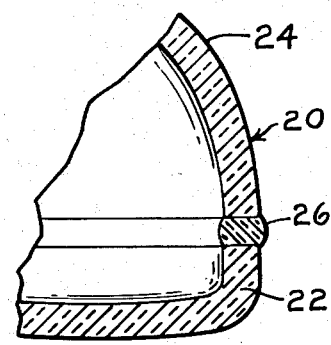
Figure 3:
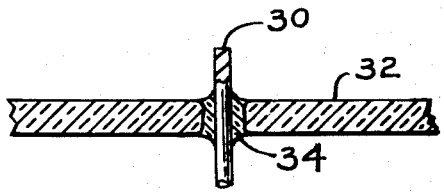
Figure 4:
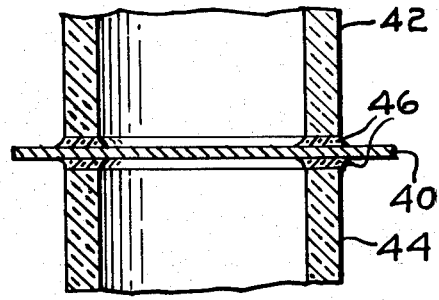
Figure 6A:
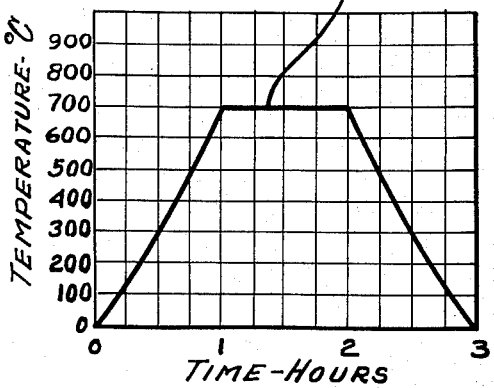
Figure 6B:
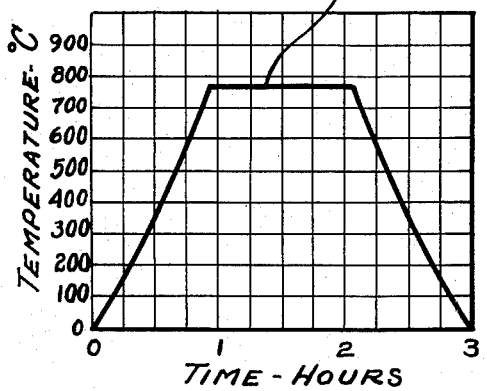

The invention further resides in composite glass products produced with the sealing glasses described above and is further described, with reference to such composite articles and their production, in conjunction with the accompanying drawing in which, FIG. 1 is an elevation view of a refractory container cased with a thermally devitrifiable glass in accordance with the invention, FIG. 2 is a fragmentary view in section of a cathode ray tube embodying an intermediate glass seal, FIG. 3 is an elevation view in section of a typical internal glass-metal seal, FIG. 4 is an elevation view in section of another glass-metal seal in accordance with the invention, and FIG. 5 is a ternary diagram characterized by a lined area illustrating the zinc-silico-borate glasses of the invention, and FIGS. 6a and 6b illustrate time-temperature sealing cycles for a glass in accordance with the invention.

Referring to FIG. 1, a conventional cylindrical shaped glass container 10 has formed on its exterior surface a uniformly thick casing or coating 12 of devitrified glass. By choosing the thermally devitrifiable glass to have a somewhat lower thermal coefficient of expansion than the material from which container 10 is formed, the exterior devitrified coating 12 forms a compressive casing over the container thus increasing its mechanical strength or resistance to breakage in known manner. In producing such cased, composite container, the container 10 is preformed in conventional manner and a thin uniform layer of finely divided sealing glass applied over its exterior surface. The suitably crushed glass may be mixed with an organic vehicle to form a slip or coating which is applied in any conventional coating manner, care being taken to secure a coating of substantially uniform thickness. The coated container is then fired in a suitable furnace on a time schedule adapted to remove substantially completely any organic vehicle or other additives prior to fusion of the glass. The temperature is raised to the sealing temperature of the glass, which for present glasses is generally on the order of about 750° C. and maintained at such temperature for a sufficient time to produce an adherent devitrified glass casing over the container surface 10. The length of time required to achieve substantially complete devitrification will vary somewhat with the glass composition, but is generally on the order of 30 minutes to an hour.

A preformed article, such as the container of FIG. 1, may alternatively have a devitrified glass label formed on a selected portion of its exterior surface in a manner similar to that described with reference to FIG. 1. The glass coating is restricted to the desired portion of the exterior surface by any known stenciling or masking procedure. It will be appreciated that, in producing cased, enameled or decorated articles, the thermally devitrifiable sealing glass may have suitable colorants incorporated in known glass making manner.

Heretofore, enameling and ceramic decorating of low expansion materials, such as boro- and alumino-silicate glasses, has presented a problem due to the lack of durable, low expansion enamels or frits having an adequately low softening temperature for application. Consequently, it has frequently been necessary to employ materials with a relatively poor expansion match and restrict application to a sufficiently thin layer so that the poor match could be tolerated. The present invention obviates this problem and permits an enamel or decoration of any desired thickness.

FIG. 2 shows a fragment of the wall in a glass cathode ray tube envelope 20 wherein a preformed panel 22 and funnel 24 are fusion sealed with a devitrified glass seal 26. In forming such a composite article, a devitrifiable glass in accordance with the invention is suspended in a suitable vehicle, and flowed onto the peripheral sealing surface of either panel 22 or funnel 24. The tube parts are then assembled as shown and heated to a sealing temperature which may be on the order of 750° C. At this temperature the glass particles fuse together to form a vitreous, fusion seal between the two preformed tube members. In known manner, the sealing temperature is selected to permit glass flow into a well rounded, or filleted, seal as shown in the drawing. Continued heating at this temperature changes the vitreous seal into devitrified or crystalline seal 26 which is fusion sealed to the panel and funnel sealing surfaces and joins them together to form a strong, hermetically sealed, composite envelope.

An alternative type of devitrified glass seal is shown in FIG. 3 where a tungsten or molybdenum wire 30 is sealed within a glass base member 32 by a thermally devitrified glass seal 34. The sealing procedure is essentially as described above. However, in working with metals sensitive to oxidation as tungsten and molybdenum are, it is generally necessary to carry out the sealing operations in a non-oxidizing atmosphere. For this purpose, it is particularly desirable to employ glasses that are free from reducible oxides such as lead oxide.

FIG. 4 illustrates a further type of glass-metal seal of considerable interest in electronic tube production. An annular metal disc 40 is sealed intermediate tubular members 42 and 44, which may be formed from either glass or a ceramic such as alumina, by fusion seals 46 of thermally devitrified glass. Conveniently, opposite sides of disc 40 are coated with thin layers of sealing glass and the coated disc assembled intermediate members 42 and 44. The assembly is then heated to sealing temperature and held for a time to produce devitrified seals 46 as described earlier. Alternatively, the sealing glass may be applied to the tubular members. The present method is particularly effective in producing deviecs where a plurality of metal discs are to be sealed to tubular sections to produce a composite device capable of withstanding high operating temperatures.

In sealing applications, the powdered glass may be preformed into compressed beads, discs or similar form for assembly with the parts being sealed. Also the glass may be pressed into a disc surrounding a metal wire, for example. If desired, the devitrifiable glass may be preglazed. Thus a layer or disc of a glass adapted to seal and devitrify at a temperature of 750° C. might be heated at a temperature of 650° C. for 10 minutes or so to produce a partial fusion or sintering of the particles. This permits easy handling of composite article components prior to final assembly and sealing. Numerous other modifications of the invention are contemplated within the scope of the invention as defined in the appended claims.

What is claimed is:

1. A thermally devitrifiable zinc-silico-borate glass composed essentially of about 60–70% ZnO, about 19–25% $B_2O_3$, and about 10–16% $SiO_2$.

2. A glass in accordance with claim 1 in which the named oxides constitute at least 90% of the glass composition.

3. A glass in accordance with claim 1 containing about 65% ZnO.

4. A glass in accordance with claim 1 containing up to 2% $Al_2O_3$.

5. A fusion type seal composed of a thermally devitrified zinc-silico-borate glass in accordance with claim 1 and wherein the devitrified crystalline phase is composed of at least one crystalline type selected from the group consisting of, $5ZnO \cdot 2B_2O_3$, $ZnO \cdot B_2O_3$ and $2ZnO \cdot SiO_2$.

References Cited in the file of this patent

UNITED STATES PATENTS

| | | |
|---|---|---|
| 1,814,012 | Taft | July 14, 1931 |
| 2,113,818 | Sullivan | Apr. 12, 1938 |
| 2,584,974 | Armistead | Feb. 12, 1952 |
| 2,889,952 | Claypoole | June 9, 1959 |

OTHER REFERENCES

"Phase Diagrams for Ceramists," by Levin, McMurdie and Hall, publ. by the Amer. Ceramic Society, Columbus, Ohio, 1956.